United States Patent Office.

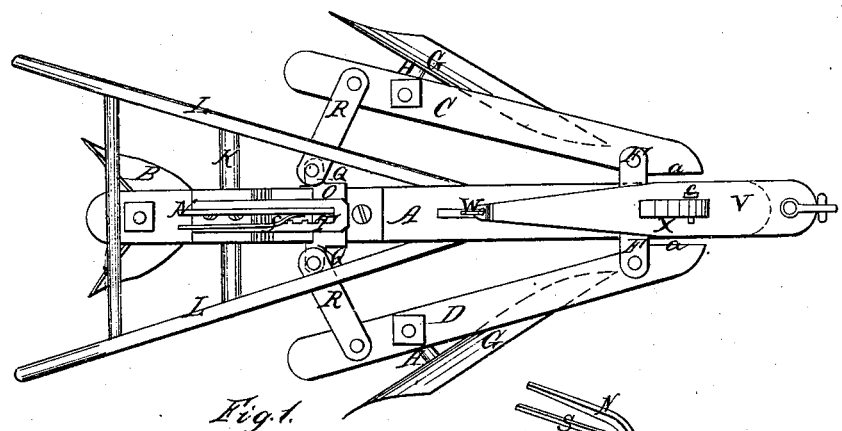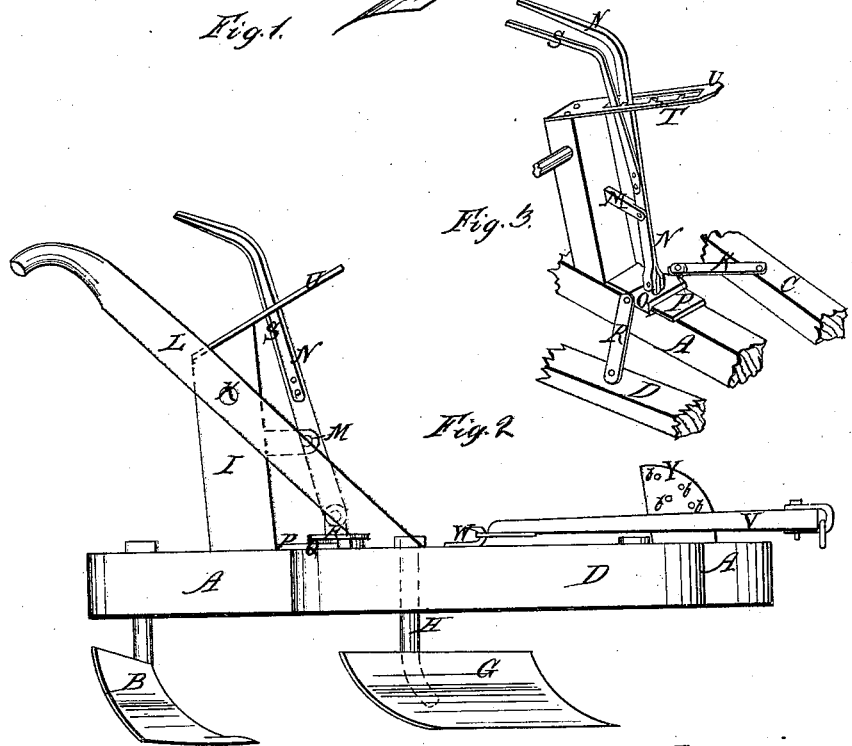

JAMES P. STANTON, OF PEDRICKTOWN, NEW JERSEY.

Letters Patent No. 68,392, dated September 3, 1867.

---

IMPROVEMENT IN POTATO-PLOUGHS.

---

The Schedule referred to in these Letters Patent and making part of the same.

---

TO ALL WHOM IT MAY CONCERN:

Be it known that I, JAMES P. STANTON, of Pedricktown, in the county of Salem, and State of New Jersey, have invented certain improvements in Potato-Ploughs; and I do hereby declare that the following, taken in connection with the drawings which accompany and form part of this specification, is a description of my invention sufficient to enable those skilled in the art to practise it.

The object of my invention is to afford a rapid and easy means for the lateral adjustment of the side ploughs or shares to any position within their range of movement, without the necessity of removing any nuts or bolts, or of using any implements for the purpose; and it consists mainly in the employment of an adjustable hand-lever, located within the reach of the ploughman whilst guiding the plough, and which, by a mere shifting of its position, actuates simultaneously and equally both of the side arms which support and carry the side ploughs. It also consists in certain details hereinafter mentioned.

Figure 1 represents a plan view, and

Figure 2 a side view of a plough having my improvements thereon.

Figure 3 is a perspective view of a portion of the centre beam, and of the devices for giving the lateral movements to the side ploughs or shares.

A represents the central or main piece, to the rear of which is firmly but removably secured the central double share or plough B. C D are two side arms or pieces pivoted to A, in any well-known manner, so as to allow them freely to turn. I prefer to connect them with the central beam by means of two strong iron cross-pieces, E, one firmly secured on the upper, and the other on the under side of the beam, and then I pass strong bolts or pins, F, through the outer ends of these cross-pieces, and through the side arms, as shown, and then head the bolts, or threaded bolts and nuts may be used. The converging ends, a of these side arms should either be somewhat rounded on their inner side, or else stand out far enough from the central beam to allow of their change of position without obstruction from the central beam. Each of these side arms carries a dished plough or share, G, the two diverging from each other rearward, and each share is firmly secured to a strong wrought-iron shank, H, which latter is firmly secured or bolted to its appropriate side arm. When secured by bolt and nut, as shown, these shanks, by being turned and adjusted in position, afford a means for varying the angle of divergence of these two side shares, and also for removing the same if need be. I is a centre post, firmly mortised or secured to the centre beam, and a stout cross-piece, K, passing through and secured to this post, and also passing into or through the plough-handles L, serves to aid in giving a firm support to the handles, which at their lower ends are permanently fastened to the centre beam in any well-known manner. From the front of the cross-piece, at about its centre, projects a wrought-iron fork, M, to which is pivoted, as shown, a hand-lever, N. To the lower forked end of this lever is pivoted a vertical piece of iron, projecting upwards from a sliding piece, O, which latter is arranged to slide on the fixed plate P, and also by having its edges turned downward and inwards, to clasp the edges of this plate, so as to insure the proper and even movements of the slide without liability to displacement. Instead of employing such slide and plate the same may be accomplished by attaching to the lower end of the hand-lever a slotted slide, through which a large headed bolt may pass, the bolt being permanently fixed in the centre beam, and allowing the slide to work back and forth. The upper end of the hand-lever is bent, as shown, in the form of a handle, and upon its side, and bent in the same form, is secured a spring, S, springing outward sidewise from the handle. In whatever position the lever may be placed, the spring, by springing outward, locks it fast in one of the series of teeth or notches, T, cut in a notched plate, U, secured to and projecting from the centre post. To side projections Q Q, on the slides, are pivoted the two links or arms R R, the other ends of these links being pivoted to the rear ends of the side arms C D. V is a draught-pole, hooked, as shown at W, to the centre beam, and slotted, as shown at X, that it may receive the post Y, which, by means of a series of holes, $b$, therein, and a pin, $c$, admits of so varying the upward pull of the draught-pole as to vary the depth of the furrow to be ploughed.

It is evident that my improved plough may be used as well for many other crops as for potatoes.

The operation of my device is apparent. Supposing the side arms to be drawn as near together as they will admit of, the lever N will then be in its most forward position, and held by the foremost notch or tooth in plate U. Now, when it is desired to separate wider apart the side ploughs or shares, the ploughman has simply to disengage the handle of the lever from the notch or detent, and pull it backward to any distance desired, and again lock it as before, upon any other tooth or notch in the plate. He can thus instantly set the side ploughs to any position within their range of lateral motion, and without loss of time or need of stopping. A small boy may thus handle and manage it. From its construction it will be seen that it takes a row at a time, and does not require, as in ordinary ploughs, the passing twice through the same row, thus saving time, labor, and horse-power. The two front ploughs are reversible, so that when they become dull on one edge they may be turned to present another edge.

1. I claim the employment of a hand-lever for shifting laterally the side ploughs substantially as described.
2. I claim such lever, combined with devices for locking the same in different positions.
3. I claim such lever, combined with a slide connected with the side-plough beams.
4. I claim such lever, combined with a side spring, operating as a self-acting locking device.

JAMES P. STANTON.

Witnesses:
    JOHN K. LOUDERBACK,
    JONATHAN H. BRADWAY.